Patented Oct. 10, 1933

1,929,732

UNITED STATES PATENT OFFICE 1,929,732

GELATIN PRODUCT AND METHOD OF PREPARING THE SAME

Clarence C. Zeigler, Maplewood, N. J., assignor to Swift & Company, Chicago, Ill., a corporation of Illinois No Drawing. Application February 11, 1930
Serial No. 427,651

16 Claims. (Cl. 99—11)

This invention relates to new gelatin products and methods of preparing the same. The gelatin products are sweetened and flavored and are readily soluble in water.

One form of the gelatin product of this invention contains gelatin, sugar, flavor and preferably a small amount of a fruit acid in the proper proportions for dissolving in water to form a gelatin dessert. It is flavored and may be colored to suit and the amount of sugar may be varied as desired. This gelatin product may be used in the preparation of gelatin desserts and also as a confection, or in preparing cake icings, etc. When prepared for the latter uses the same proportions of ingredients may be used as are employed in the gelatin product used for desserts, or the ingredients or proportions may be varied somewhat.

Another form of the gelatin product is very highly flavored. It contains in addition to gelatin and sugar, sufficient flavor so that when additional gelatin and sugar (e. g. five or six times as much gelatin and sugar as are present in the original gelatin product) are dissolved in water with the original gelatin product, preferably with the addition of a small amount of a fruit acid, and the whole is allowed to gel, a properly flavored gelatin dessert is obtained.

Several schemes have been devised for marketing gelatin and flavoring material in a single package for the preparation of gelatin desserts and salads. Heretofore a flavored gelatin dessert has not been prepared which is readily soluble and suitable for marketing in a soft pliable tablet or wafer form. The gelatin products of this invention are readily soluble and contain flavors such as the fruit flavors, for example strawberry, raspberry, mint, lemon, orange, lime, etc. The gelatin products when manufactured for the preparation of gelatin desserts without the addition of other gelatin and sugar or other ingredients thereto, will generally contain a fruit acid to bring out the fruit flavor. If orange or lemon is used for flavoring, citric acid is ordinarily employed for this purpose. For other flavors tartaric acid may be preferred.

In addition to the flavor and gelatin the gelatin products contain a small amount of water, for example not over 15 or 20%, and an ingredient such as invert sugar, which will not crystallize from solution but keeps the gelatin in gel form and which prevents partial or complete dehydration of the gelatin so that it cannot return to the original dry, hard, commercial form, or at least lengthens the time during which the product will remain soft and pliable. Instead of invert sugar a crystallizable sugar may be added to the gelatin solution together with some other ingredient such as glycerine or diethylene glycol to prevent the crystallization of the sugar. The gelatin is thus maintained in gel form and the flavor is kept fresh in this gel until ready for use. The gelatin products of this invention may contain other sugar such as sucrose in addition to the invert sugar and all of such other sugar may be in crystalline form. In general the gelatin products contain gelatin in the gel form and sugar in the liquid form and at least one of these ingredients in a dry form also.

Gelatine in a more or less completely dehydrated or hard state is referred to as being "in a dry form" throughout the specification and the term "gel" is employed to designate the semi-solid state in which gelatin occurs after being dissolved in not too much water, and then allowed to gel. When sugar is dissolved with gelatin in this form, the sugar is referred to as being in the "liquid" form as distinguished from the crystalline or dry or granulated form. In a gelatin dessert gelatin occurs in the gel form and the sugar is in the liquid form gelatin dessert, however, is much greater than that in the gelatin products in this invention. By incorporating in the solution of gelatin and water some invert sugar or other ingredient, such as glycerine or diethylene glycol together with crystallizable sugar, a gel is obtained containing sugar and glycerine in a form in which they are prevented from crystallizing out and the product does not readily become dry and hard.

The gelatin products of this invention contain gelatin in the gel form with flavor in the liquid form dissolved therein together with some ingredient which retards dehydration of this gelatin. This gives a product which remains soft and pliable and does not readily become dry and hard. In order to give body to this gel product I add to a solution of the ingredients containing gelatin in the sol form a readily soluble ingredient in crystalline or dry form and I add this ingredient to the sol under such conditions and in such proportions that it does not readily dissolve but is mixed throughout the mass of the sol and gives body to the gel which forms. Gelatin in a dry form or crystalline sugar may be employed for this purpose. By incorporating dehydrated gelatin in this manner I obtain a product which contains more gelatin than will dissolve in the water or so much gelatin that if it were dissolved in the small amount of water present in the product, a very thick heavy sticky mixture would be obtained which could not be handled successfully on a commercial basis. By thus incorporating gelatin in a dry form in the gel I prepare a gelatin product which contains fruit or other flavor and a high percent of gelatin, all in readily soluble form and without preparing as an intermediate product a thick heavy sticky solution of gelatin in water, which has heretofore been considered necessary to the preparation of such a product and has prevented the commercial preparation of fruit flavored gelatin tablets or pellets or wafers of high gelatin concentration.

The invention will be further described in connection with the following examples, but it is intended and is to be understood that it is not limited thereto:

*Example 1.*—This product when made up on the basis of 1000 pounds contains approximately the following ingredients:

| | Pounds |
|---|---|
| Invert sugar (25% water) | 273 |
| Granulated cane sugar | 575 |
| Granulated gelatin (10% moisture) | 100 |
| Water | 36 |
| Powdered fruit acid | 16 |

Color and flavor to suit.

Ten pounds of the gelatin or enough to give the finished gelatin product sufficient body is dissolved in the water and to this is added the invert sugar. If the amount of gelatin is varied, the amount of invert sugar should be correspondingly varied so as to have a sufficient amount of the invert sugar to prevent the gelatin product from becoming too dry and hard. If the amount of invert sugar is altered, the amount of granulated sugar should be altered inversely in order to maintain constant sweetness, or the amount of sugar may be varied somewhat to taste. The gelatin and invert sugar are heated to about 60° C. When this temperature is reached, the color and flavor are added and the whole is mixed with the remainder of the formula which has previously been mixed together in dry form. The product is then poured into molds or on a slab and stamped in the desired form, after which it is chilled and becomes a soft pliable solid. The gelatin used in this formula has a jelly strength of 225 grams with a Bloom gelometer.

A tablet or wafer of the above composition weighing about 3.4 ounces when dissolved in one pint of water and then allowed to gel forms a delicious gelatin desserts. The size and form of the tablet or wafers may be varied as desired. Different fruit flavors may be employed and the corresponding color will generally be added to give the product an attractive appearance. The tablets may be packaged in any suitable way as by wrapping them in cellophane, or other transparent wrapping material.

*Example 2.*—Part A of this example refers to the new gelatin product. It is advantageously packaged with Part B and marketed in this way.

*Part A.*—The gelatin product is made up of approximately the following ingredients:

| | Pounds |
|---|---|
| Invert sugar (25% water) | 16 |
| Granulated gelatin (10% moisture) | 7/10 |
| Water | 2 |
| Powdered sugar | 30 |

Color and flavor to suit.

The amount of powdered sugar may be varied somewhat but a sufficient amount is added to make a soft pliable product.

Dissolve the gelatin in the water and add the invert sugar. Heat to 60° C. and add the color and flavor. Remove from the heat and stir in the powdered sugar. When the product is cold, it will be a soft, pliable solid and can be molded into any convenient form, such as pellets or wafers.

*Part B.*—This is a dry mixture of gelatin, sugar and fruit acid of the following amounts:

| | Pounds |
|---|---|
| Granulated sugar | 800 |
| Granulated gelatin (10% moisture) | 100 |
| Powdered fruit acid | 16 |

The gelatin used in this formula has a jelly strength of 225 grams when tested with a Bloom gelometer.

If a pellet or wafer of Part A weighing about ¼ oz. is dissolved in one pint of water with 3¼ ozs. of Part B and the whole is allowed to gel, a delicious gelatin dessert is produced. The gelatin product of Part A is advantageously packaged with Part B in approximately these proportions, and each package will contain one pellet or several pellets of uniform size. The proportions of sugar and gelatin in Part A may be varied somewhat and the proportions of sugar and gelatin in Part B should then be varied inversely and the proportions of Part A and Part B altered correspondingly to produce a product of the same sweetness, although the total sugar content may be varied somewhat as desired.

By "gelatin product" as used in the claims I mean a gelatin preparation of substantially uniform composition which can be subdivided readily to produce tablets, wafers, pellets, etc. of any size and of uniform analysis.

I claim:

1. A readily soluble gelatin product comprising gelatin in gel form with flavor dissolved therein together with an ingredient to prevent the gelatin from becoming dehydrated and a readily soluble ingredient mixed substantially uniformly throughout the gel in a dry form.

2. A gelatin dessert, comprising readily soluble gelatin, flavor and sweetening, a part of the gelatin being in gel form and part being in the dry form and the whole comprising less than twenty percent of water, the gelatin in the dry form being substantially uniformly distributed throughout the product.

3. A readily soluble gelatin product, comprising gelatin in gel form with fruit flavor and sugar in liquid form dissolved therein and gelatin and sugar in the dry form, the gelatin and sugar in the dry form being substantially uniformly distributed throughout the product.

4. A readily soluble gelatin product, comprising gelatin in gel form, fruit flavor dissolved therein and sugar and gelatin in the dry form, the gelatin and sugar in the dry form being substantially uniformly distributed throughout the product.

5. A readily soluble gelatin product, comprising gelatin in gel form and flavor dissolved therein with crystals of sugar scattered substantially uniformly throughout the gelatin product.

6. A readily soluble gelatin product, comprising gelatin in gel form, a fruit flavor and a non-crystallizable sugar in liquid form dissolved therein and sugar in crystalline form substantially uniformly distributed throughout the product.

7. A readily soluble gelatin product, comprising gelatin in gel form, a fruit flavor dissolved therein, and a substance to prevent the gelatin from becoming dehydrated, gelatin in the dry form and sugar in crystalline form, the gelatin which is in the dry form and the sugar which is in the crystalline form being substantially uniformly distributed throughout the product.

8. A readily soluble gelatin product, consisting of gelatin in gel form, a fruit flavor, and a non-crystallizable sugar in liquid form dissolved therein, crystallized sugar, gelatin in the dry form and a fruit acid, the gelatin in the dry form and the crystallized sugar being substantially uniformly distributed throughout the product.

9. A readily soluble gelatin product containing sugar, flavor and water and at least enough gelatin to form a very thick, heavy, sticky mixture with the water present, part of the sugar being crystalline and substantially uniformly distributed throughout the product.

10. A readily soluble gelatin product comprising gelatin in gel form, a fruit flavor dissolved therein, crystallized sugar, gelatin in the dry form and a fruit acid, the gelatin in the dry form and the crystallized sugar being substantially uniformly distributed throughout the product.

11. In combination in a package, crystallized sugar, gelatin in the dry form and a readily soluble gelatin product containing gelatin in gel form with a flavor dissolved therein, the contents of the package being present in such proportion that when dissolved in water a gelatin dessert may be formed.

12. The method of preparing a gelatin product, which comprises dissolving in a small amount of water, fruit flavor, gelatin and a substance to prevent the gelatin from returning from the gel form to the dry form, adding a readily soluble ingredient thereto in the dry form in an amount in excess of what dissolves in the solution, suspending said ingredient in the solution by agitation and allowing the whole to gel to form a gelatin product containing gelatin in the gel form with particles of the ingredient mixed therethrough in the dry form.

13. The method of preparing a gelatin product, which comprises dissolving a fruit flavor, gelatin, and an ingredient to prevent the gelatin from returning from the gel form to the dry form and mixing therewith a readily soluble material in the dry form, and allowing the whole to cool before all of the latter has gone into solution.

14. The method of producing a gelatin product, which comprises dissolving a fruit flavor, gelatin, and a non-crystallizable sugar in water and mixing therewith sugar and gelatin in an amount greater than that which dissolves in the water.

15. The method of preparing a gelatin product, which comprises dissolving a fruit flavor, gelatin, and invert sugar in small amount of water, mixing therewith crystallized sugar, gelatin in the dry form, and a fruit acid in an amount greater than that which dissolves in the water, and allowing the mixture to gel and form a soft pliable solid.

16. In the preparation of a gelatin product the steps which comprise mixing in a solution of gelatin, fruit flavor and sugar in a small amount of water an additional quantity of gelatin and sugar and allowing the whole to cool before the added gelatin dissolves.

CLARENCE C. ZEIGLER.